P. KILLEN.
Churn.
No. 43,513.
Patented July 12, 1864.
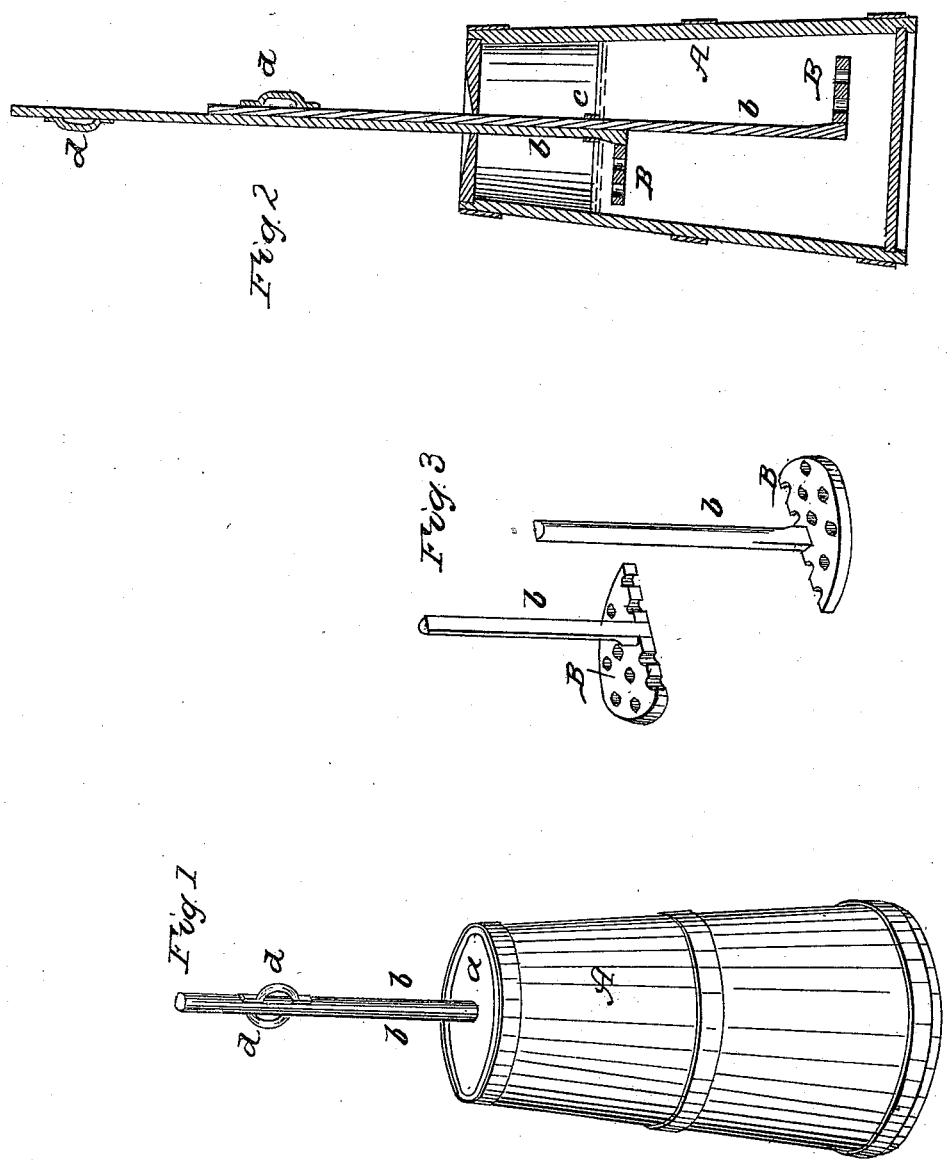

UNITED STATES PATENT OFFICE.

PATRICK KILLIN, OF MOUNT HEALTHY, OHIO.

CHURN.

Specification forming part of Letters Patent No. 43,513, dated July 12, 1864.

*To all whom it may concern:*

Be it known that I, PATRICK KILLIN, of Mount Healthy, in the county of Hamilton and State of Ohio, have invented a new and useful Improvement in Churns; and I hereby declare that the following is a full, clear, and exact description of the same, reference being had to the accompanying drawings and letters of reference marked thereon, which form part of this specification.

My invention consists in dividing the ordinary circular or disk dasher used in upright churns into two halves, and also dividing the dash-rod, or attaching a dash-rod to each half, so that they may be worked one by each hand alternately.

In the accompanying drawings, Figure 1 is a perspective view of a churn containing my improved dasher. Fig. 2 is a vertical axial section of the same. Fig. 3 is a perspective view of the two halves constituting my improved dasher.

Like letters of reference designate like parts in all the drawings.

A is the churn or barrel, having a cover, *a*, as in ordinary cases. B B are the two semi-disks constituting the dashers, perforated as is usual in the old or circular dasher. *b b* are the two dash-rods, formed each as semi-cylinders, and connected or kept together by *c*, a metallic ring or sleeve within the churn. *d d* are handles, which may be of any form; or they may even be constructed in the form of short cross arms--thus ⊢—attached to each rod.

The manner of using my invention will be evident on inspection. Taking hold of a handle, *d*, with each hand, the operator alternately lifts one dasher and depresses the other until the churning is completed. The two are then joined by the hands, and used together as one dasher in gathering the butter.

The advantages of my invention are increased ease in operating the churn, the strain being taken off the muscles of the back of the operator and transferred to those of the arms, the dasher which is depressed forming, through the arm and hand depressing it, a fulcrum for the arm which is raised. The agitation of the fluid within the churn is likewise more violent and complete when my dasher is used, as may readily be understood by a consideration of the drawings. In gathering the butter, too, after the churning is completed, both dashers may be used together as one dasher.

The two dashers may, however, be worked alternately up and down, as described, by or through appropriate machinery, instead of by hand.

Having described my invention, I shall proceed to state what I claim as new, and what I desire by Letters Patent to secure.

I claim—

Making the dasher in two parts, B B, with a separate rod, *b b*, to each inclosed by the loose ring *c*, so that the two parts may be operated separately, in the manner described, or united and operated as a single dasher, for the purpose herein set forth.

PATRICK KILLIN.

Witnesses:
 GEO. PYBURN,
 WM. CLOUGH.